United States Patent Office.

CARL OSCAR MÜLLER, OF BASLE, SWITZERLAND, ASSIGNOR TO L. DURAND, HUGUENIN & CIE., OF SAME PLACE, ST. FONS, FRANCE, AND HÜNINGEN, GERMANY.

RED DYE AND PROCESS OF MAKING SAME.

SPECIFICATION forming part of Letters Patent No. 631,089, dated August 15, 1899.

Application filed April 6, 1899. Serial No. 711,903. (Specimens.)

*To all whom it may concern:*

Be it known that I, CARL OSCAR MÜLLER, chemist, a subject of the King of Saxony, and a resident of Basle, Switzerland, have invented new and useful Improvements in the Manufacture of Coloring-Matters for Dyeing Mordanted Wool, of which the following is a clear, full, and exact specification.

According to the publications up to the present time (see German Patent No. 70,885 and *Fortschritte der Theerfarbenfabrikation und Verwandter Industriezweige*, by Friedländer, Vol. I, page 523) the disazo coloring-matters containing the tetrazo derivative of paraphenylenediamin cannot be applied to the dyeing of wool on account of their weak resistance to light. I have, however, found that contrary to the above facts disazo coloring-matters can be obtained containing the tetrazo derivative of paraphenylenediamin, which resist light and fulling and which are therefore of considerable industrial value if one of the components, coupled with the said tetrazo derivative, is formed by an orthocarboxylized phenol of the benzene series, such as salicylic acid and its homologues, while the other component, coupled with the said tetrazo derivative, is constituted by a sulfonic acid of a naphtolic compound, such as the naphtols and oxynaphtols. The coloring-matters thus obtained produce upon wool which is chromed either before or after dyeing red to blue-black tints, which are exceedingly resisting to light and fulling.

For the manufacture of these coloring-matters the best way is to go out from the amidobenzeneazosalicylic acid, though according to the publications (see *Meldola Chemical Society*, 1885, Vol. I, page 668) the diazo compound of this acid cannot, it is claimed, be combined with naphtolsulfonic acids.

Example: Twenty-seven kilos of para-amidobenzeneazosalicylic acid (obtained either by combination of paranitrodiazobenzene with salicylic acid and the subsequent reduction of the resulting combination or by combination of the diazo derivative of monoacet-para-phenylenediamin with salicylic acid and subsequent saponification of the resulting combination) are transformed in the known manner into the diazo derivative. This derivative is run into a solution of thirty kilos of the naphtolsulfonic acid of Neville-Winther rendered alkaline by means of carbonate of soda in order that the mass may remain alkaline up to the end of the reaction. The coloring-matter formed is precipitated by an addition of common salt and is pressed and dried. It dyes chromed wool in red tints that are very resisting to light and fulling and constitutes in dry state a black powder, which dissolves in warm water with a red and in concentrated sulfuric acid with blue coloration.

Instead of the naphtolsulfonic acid of Neville-Winther may be employed the other known mono- and disulfonic acids of alpha-naphtol, beta-naphtol, and oxynaphtols—such as dioxynaphtalene 1.8, dioxynaphtalene 1.7, &c.

The salicylic acid may be replaced by cresotinic acid, (ortho-oxy-toluic acid.)

What I claim is—

1. A process for the manufacture of coloring-matters for dyeing mordanted wool, which consists in coupling one molecule of the diazo derivative of para-amido-benzeneazosalicylic acid with one melecule of a sulfonic acid of a naphtolic compound.

2. As a new article of manufacture, the herein-described dyestuff which contains the tetrazo derivative of para-phenylenediamin coupled on the one hand with salicylic acid and on the other hand with naphtol-monosulfonic acid of Neville-Winther and which dyes chromed wool in red tints very resisting to light and fulling, constitutes in dry state a black powder and dissolves in warm water with red and in concentrated sulfuric acid with blue coloration.

In witness whereof I have hereunto signed my name, this 27th day of March, 1899, in the presence of two subscribing witnesses.

CARL OSCAR MÜLLER.

Witnesses:
GEORGE GIFFORD,
AMAND RITTER.